Figure 3:
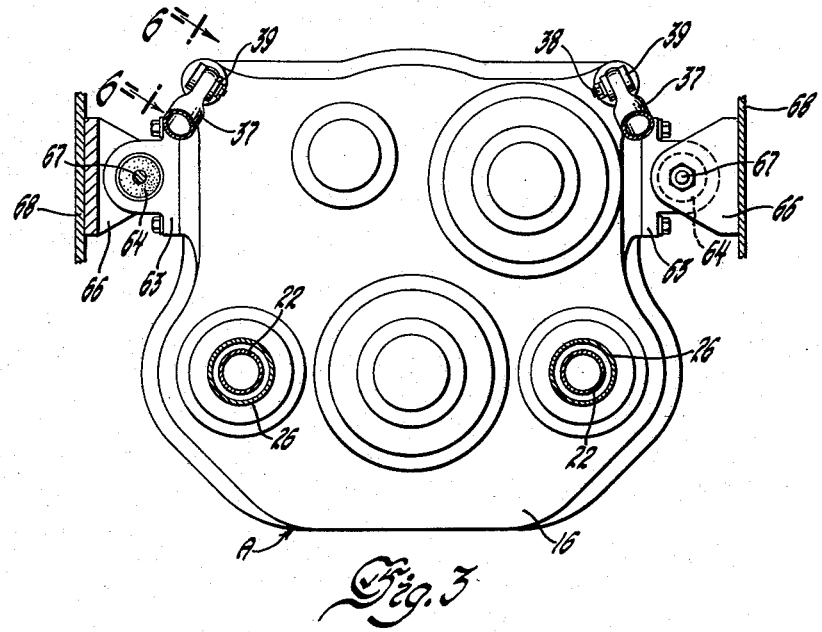

Sept. 27, 1955     C. J. McDOWALL     2,718,756
MOUNTING AND SUPPORTING STRUCTURE FOR AIRCRAFT GAS
TURBINE POWER PLANTS HAVING REDUCTION GEARING
Filed June 14, 1951     4 Sheets-Sheet 1
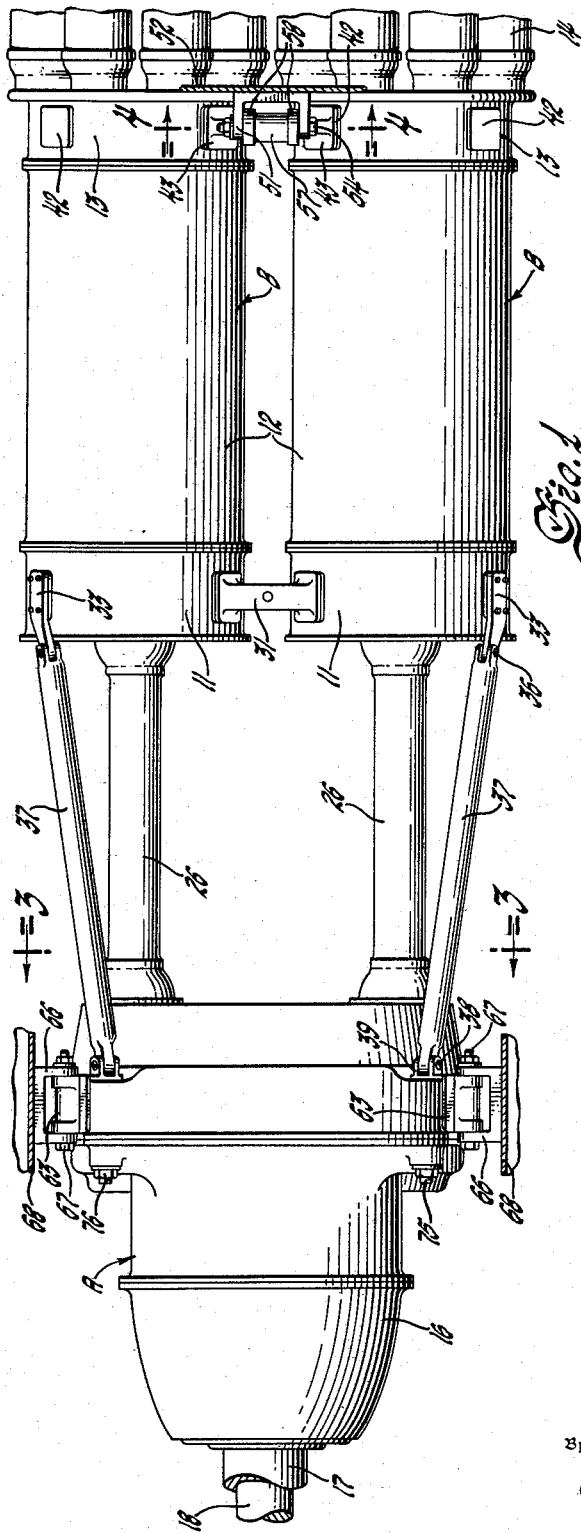
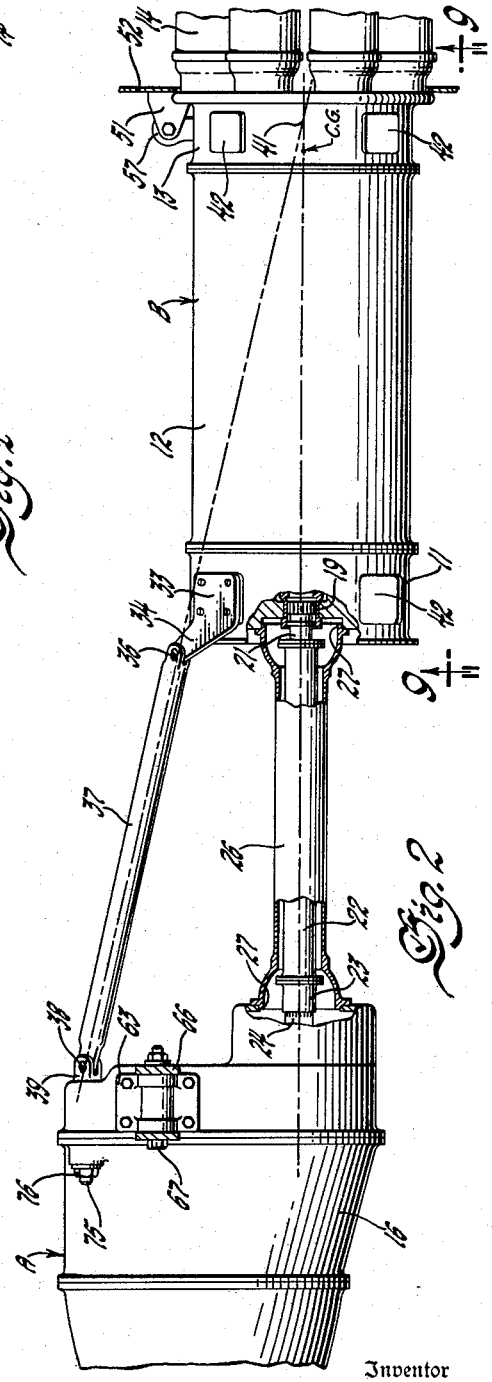
Inventor
Charles J. McDowall
By Willits, Helmig & Bailio
Attorneys Sept. 27, 1955  C. J. McDOWALL  2,718,756
MOUNTING AND SUPPORTING STRUCTURE FOR AIRCRAFT GAS
TURBINE POWER PLANTS HAVING REDUCTION GEARING
Filed June 14, 1951  4 Sheets-Sheet 2

Inventor
Charles J. McDowall
By Willits, Helwig & Baillio
Attorneys

Sept. 27, 1955          C. J. McDOWALL                2,718,756
        MOUNTING AND SUPPORTING STRUCTURE FOR AIRCRAFT GAS
           TURBINE POWER PLANTS HAVING REDUCTION GEARING
Filed June 14, 1951                         4 Sheets-Sheet 3

Inventor
Charles J. McDowall
By
Willits, Helmig & Baillio
Attorneys

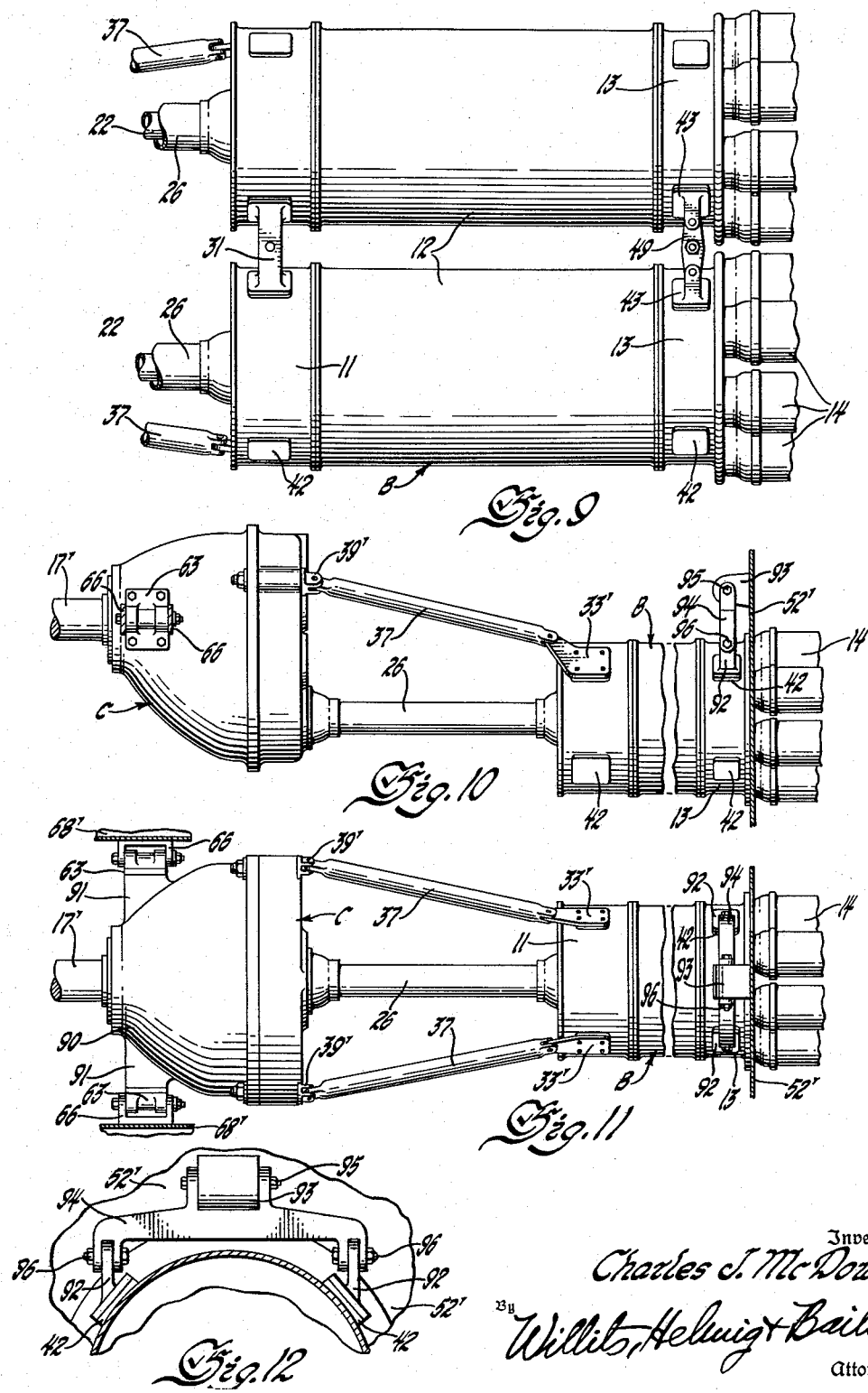

United States Patent Office 2,718,756
Patented Sept. 27, 1955

2,718,756
MOUNTING AND SUPPORTING STRUCTURE FOR AIRCRAFT GAS TURBINE POWER PLANTS HAVING REDUCTION GEARING

Charles J. McDowall, New Augusta, Ind., assignor to General Motors Corporation, Detroit, Mich., a corporation of Delaware Application June 14, 1951, Serial No. 231,498

27 Claims. (Cl. 60—39.31)

This invention relates to power plant installations. The invention is particularly directed to the integration of one or more gas turbine engines and a reduction gear assembly driven by the engines for the purpose of operating a propeller into a unitary structure and to improved provision for supporting this structure in an aircraft. The invention will therefore be described and illustrated in connection with this preferred mode of application of the principles of the invention, although other applications thereof will occur to those skilled in the art.

It has been proposed previously to drive an aircraft propeller by two gas turbine engines or power units coupled to a common reduction gear. One example of such an installation is generally described in an article in Aviation Week, volume 51, number 23, pages 11 to 13 (December 5, 1949). In the installation there described, the reduction gear is separately mounted in the aircraft from the power units, which are coupled to it by extension shafts. A similar arrangement could be used with a single power unit coupled to a reduction gear.

My invention is directed to a highly superior arrangement for coupling and installing the reduction gear and the prime mover as a unit offering major advantages of installation in the aircraft. Among the advantages of the invention is the fact that the components are readily separable for maintenance or replacement of units which require overhaul. Another important advantage lies in the provision of an interconnecting structure which greatly reduces the weight of the installation over previous proposals while maintaining a high degree of strength, which is peculiarly adapted to the dimensions, structural characteristics, and thermal expansion characteristics of gas turbine power plants, and which greatly facilitates the installation of air intake ducting for the engines.

Figure 4:
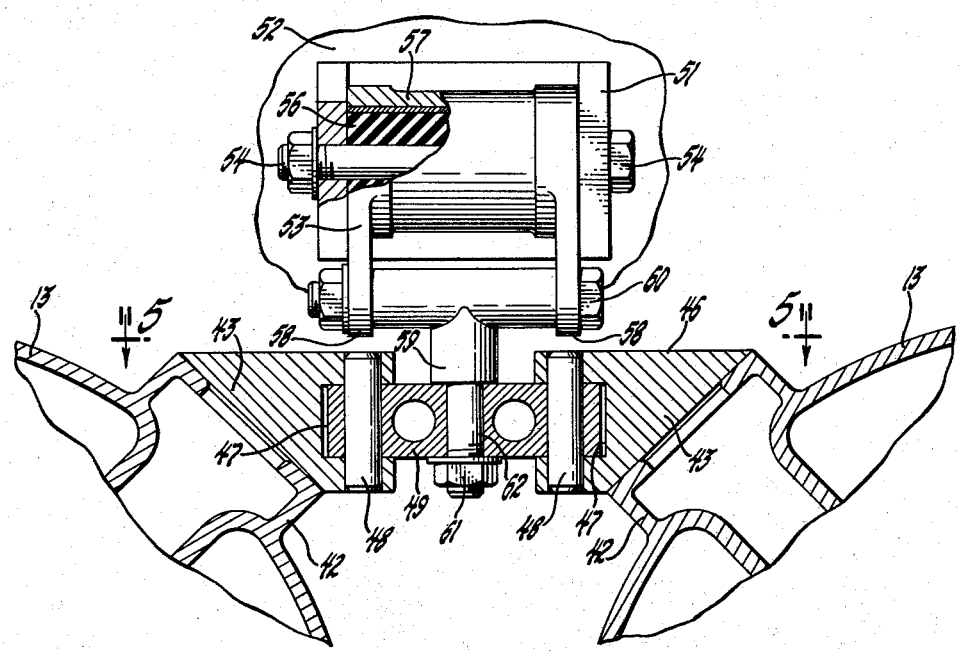
Figure 5:
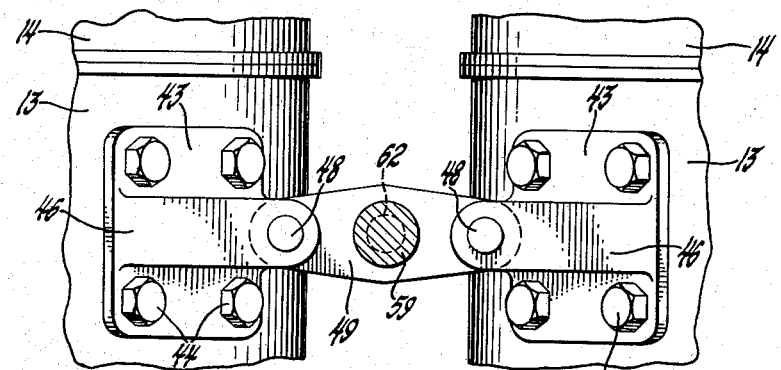
Figure 6:
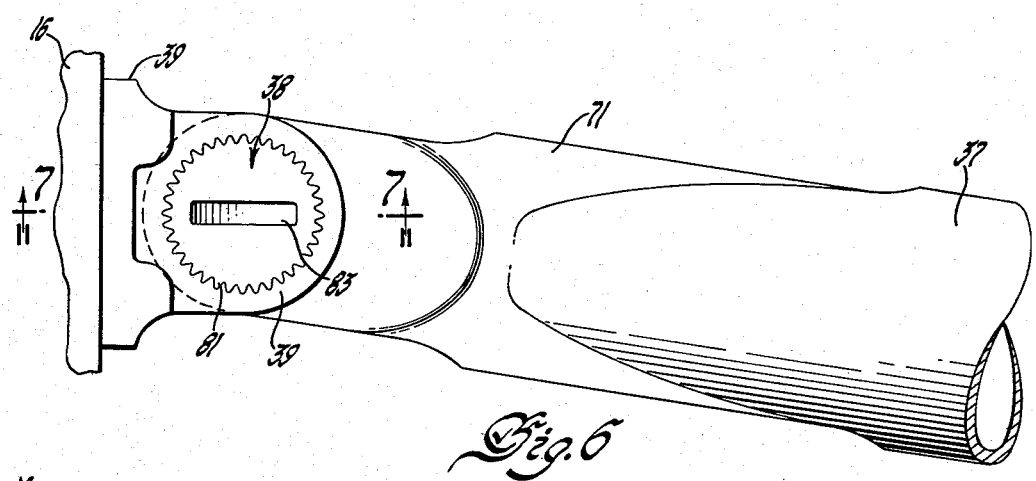
Figure 7:
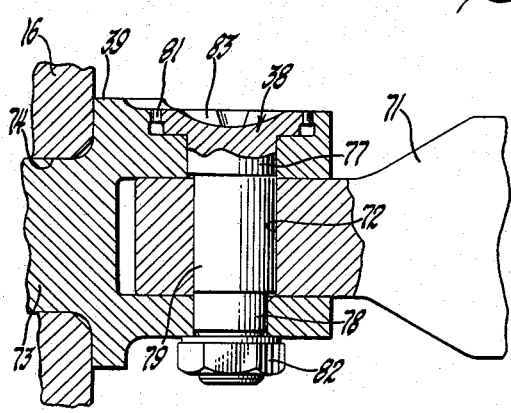
Figure 8:
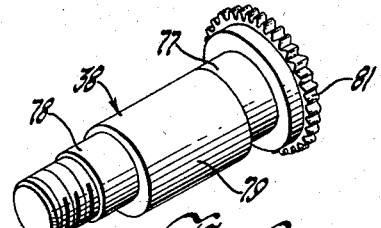

The principal objects of the invention will be apparent from the foregoing discussion, and the objects and advantages of the invention will be more fully apparent from the succeeding detailed description of preferred embodiments of the invention. Referring to the drawings, Figure 1 is a plan view of an aircraft gas turbine propeller power plant in accordance with the invention, the rear portions of the power units being omitted from the figure; Figure 2 is a side elevation view corresponding to Figure 1 with certain parts in section; Figure 3 is a vertical section taken on the plane 3—3 indicated in Figure 1; Figure 3 is a partial vertical section taken on the plane 4—4 indicated in Figure 1, illustrating the rear support and the interconnecting link between the power units; Figure 5 is a sectional view taken on the plane 5—5 indicated in Figure 4; Figure 6 is an elevation view as seen from line 6—6 of Fig. 3 of the front end of a strut or tie rod joining the reduction gear to a power unit; Figure 7 is a sectional view taken on the plane 7—7 inidcated in Figure 6; Figure 8 is an axonometric view of a coupling pin; Figure 9 is a partial view from below of the installation of Figures 1 and 2 as seen from line 9—9 of Fig. 2; Figures 10 and 11 are partial elevation and plan views, respectively, of a single power unit installation; and Figure 12 is a partial cross-sectional view of the same.

Referring first to Figures 1 and 2, the power plant there shown comprises a reduction gear assembly A and two engines or power units B. The engines are mounted side by side with their axes parallel. Each engine comprises a forward frame 11, a compressor housed in a casing 12, a midframe 13, and a combustion section 14, only the forward portion of which is shown in the drawings. The forward frame 11 provides a support for the forward bearing of the compressor shaft and defines the air inlet to the unit. The compressor is of the well-known axial-flow type. The midframe 13 supports the rear bearing for the compressor shaft and serves as an outlet or diffuser through which the compressed air flows to the combustion section. The frames 11 and 13 are thus part of the compressor in a functional sense. The combustion section discharges into a turbine (not shown) which drives the compressor and exhausts into an exhaust duct (not shown). The structure of the engine aft of the midframe is supported from the midframe. Here, and subsequently, reference to the forward end of the power plant is intended as referring to the end on which the reduction gear is mounted. This terminology is adopted merely for clarity, as it is possible to mount the power plant with the reduction gear or the compressor inlet at the rear of the power plant as installed in an aircraft. The compressor inlets 11 are supplied with air through suitable ducting (not shown).

The above general description of the engines is by way of introduction, since the structure and internal mechanism of the engines may be of various types, and an understanding of this mechanism is not essential to an understanding of my invention.

The details of the reduction gear assembly A are likewise immaterial to the invention. It will suffice to say that the reduction gear assembly comprises a casing 16 within which is housed gearing which receives the power input from the engines, steps down the speed, and drives the propeller shaft or shafts which are concentric counter-rotating shafts 17 and 18 as illustrated. The reduction gear may include a starter, clutches, brakes, and other accessories immaterial to the invention.

The propeller (not shown) is mounted on the propeller shaft or shafts in any suitable manner and is thus supported by the reduction gear, which receives the thrust, torque load, and gyroscopic reaction of the propeller.

Since the general nature of engines and reduction gears of types to which my invention may be applied are well known to those skilled in the art and the details of the engines and reduction gears are immaterial to the invention, these will not be further described.

Referring to Figure 2, the power output from each engine B is taken from the forward end of the compressor shaft 19 by an extension shaft comprising a rear portion 21 which fits into the end of the compressor shaft and is externally splined, the compressor shaft being internally splined. The portion 21 is formed with a flange by which it is bolted to the major portion 22 of the shaft, which is similarly bolted to a forward coupling portion 23 internally splined to engage a splined input shaft 24 of the reduction gear assembly. The coupling shaft is housed in a tubular column or strut 26 which is formed with a bell at each end flanged for bolting to the reduction gear casing 16 and forward frame 11, respectively. The ends of the strut 26 are formed with pilot portions 27 which enter into mating openings in the reduction gear and engine to provide accurate lateral alignment of the strut.

This strut 26 constitutes a structural member rigidly joining the corresponding engine to the reduction gear and also provides a protective housing for the extension shaft 22. It will be understood that, because of the splined connection of the extension shaft, the extension shaft transmits torque only and does not take any other load.

The forward ends of the two engines are rigidly fixed together by two brackets 31 (Figures 1 and 9) bolted to mounting pads on the outer surface of the forward frames 11. Each forward frame is formed with four such mounting pads disposed at 45 degrees and 135 degrees from the vertical. The two inner pads of each forward frame are employed for mounting the brackets 31, which are rigid members joining the two engines. The upper outer pad of each forward frame provides for the attachment of a bracket 33 which is bolted thereto. Each of these brackets has an extension 34 which is cross bored for a pin 36 by which is attached a strut or tie rod 37 extending from the power unit to the reduction gear. The forward end of each tie rod 37 is coupled by a pin 38 to a clevis fitting 39 bolted to or integral with the reduction gear casing 16.

The struts 37 thus provide a second structural link between each engine and the reduction gear. It will be noted that the struts 37 are disposed considerably above the struts 26. It will be further noted that the planes containing, respectively, the axes of the struts 26 and the axes of the struts 37, which are indicated by broken lines in Figure 2, intersect in a line indicated at 41 passing through the midframes 13 adjacent the line, indicated by the notation C. G., which passes through the centers of gravity of the engines B. It is highly desirable that the line of intersection 41 pass through the midframes 13, as one point of support of the power plant is at the midframes, as will be explained.

The two engines are additionally coupled together structurally at the midframes 13 by an arrangement which definitely locates the axes of the engines relative to each other but which allows for relative longitudinal expansion of the engines. This provision for longitudinal expansion is required because, if one engine is in service and the other is idle, the compressor casing of the operating engine will heat and expand longitudinally relative to that of the idle engine. As illustrated in Figures 1, 4, 5, and 9, the midframes 13 are provided with pads 42 at each of the 45 degree points around the engine. A bracket 43 is secured to the upper and lower inner pads of each engine as by cap screws 44. This bracket comprises a rib 46 which is milled through to provide a slot 47 (Figure 4) and drilled for a pin 48. Two links 49 extending between the two engines and of such depth as to fill the slots 47 are articulated to the bracket portions 46 by the pins 48. As will be seen, these connections comprising the upper and lower links 49 tie the engines together against relative horizontal or vertical movement but permit longitudinal expansion.

The entire assembly of reduction gear and engines is supported in the aircraft by three mounts or supports, at two spaced points on the reduction gear and one point at the midframe of the engines. The midframe support, illustrated principally in Figures 1, 2, 4, and 5, may comprise a U-shaped bracket 51 fixed in any suitable manner to a structural element of the aircraft such as the transverse plate 52 illustrated fragmentarily in the figures. The upper link 49 is illustrated as supported from the bracket 51 by means of a hanger 53 which is mounted on a bolt 54 extending between the arms of the bracket 51. A sleeve 56 of rubber or other shock absorbing material is disposed between the bolt 54 and the cylinder portion 57 of the hanger. The hanger 53 comprises two arms 58 which constitute a clevis between which is rotatably mounted a T-shaped fitting 59 by a bolt 60 passing through the upper portion of the fitting. The link 49 is mounted on the lower arm of the T 59 by a nut 61 threaded onto a reduced diameter extension 62 of the arm 59. As will be apparent, this construction permits the link 49 to rotate about a vertical axis. It also permits the midpoint of the link 49 to move forwardly or rearwardly by swinging movement of the hanger 53 about the bolt 54. The rubber sleeve 56 is provided to lessen transmission of vibration.

The engine is additionally supported at two points defining a transverse axis of suspension at the reduction gear A, and preferably (for installation reasons) adjacent the rear end of the reduction gear. These supports, as illustrated in Figures 1 to 3, inclusive, preferably employ rubber bushings in a manner similar to the rear support to reduce transmission of vibrations and provide a slight degree of flexibility. The preferred form of support, as illustrated, comprises brackets 63 bolted to the reduction gear case adjacent the rear end thereof, which brackets are bored transversely to receive a rubberlike bushing 64. U-brackets 66 mounted on the fixed structure of the aircraft straddle the brackets 63, and bolts 67 passing through the arms of the brackets and the bushings 64 hold the power unit in place. The brackets 66 are permanently mounted in any suitable manner in the aircraft, and are indicated as being mounted on frame members 68 of the aircraft. The two supports at the reduction gear thus provide a primary support for the power plant installation taking the major part of the mass reaction of the engine, all of the propeller thrust, and the propeller shaft torque, which may be considerable in the case of a single rotation propeller. Since the relatively heavy propeller is overhung forwardly of the reduction gear supports and the center of gravity of the reduction gear itself is ahead of the supports, most of the weight of the entire installation as shown is carried by the two forward supports. The distribution of weight between the supports could, however, be varied to suit any particular installation.

The rear support 51 carries the remainder of the engine load, but acts primarily to locate the engine axially and prevent vertical or horizontal rotation about the forward supports. It will be understood that the principal forces are not those due to the weight of the power plant alone, but inertia forces due to acceleration of the aircraft. The relative magnitudes of these inertia forces at the several points of support are in proportion to the weight loads at these points under static conditions.

In an installation not subjected to the high acceleration stresses for which an aircraft installation must provide, the hollow struts or shaft housings 26 would be adequate to carry the torsional load between the engines and the reduction gear and the bending moments and shear forces. The heavy forces due to acceleration in an aircraft, which acceleration is greatest in a vertical direction, are adequately taken care of by the additional struts or tie rods 37 which provide much greater strength or stiffness of the structure. Due to the disposition of the struts so that the lines of action of the struts converge towards the line 41 adjacent the plane of the rear support 51 of the installation, the struts 37 may be articulated at the ends so that they receive no stresses other than direct tension or compression stresses. Normally, the struts 37 are in tension in the installation of Figure 1; upward acceleration increases the tension, and downward acceleration may put the struts 37 in compression.

Moreover, any bending or shear loads within the power units due to the reduction gear and propeller are carried by the relatively strong and rigid compressor assembly 11, 12, 13.

It may be noted that, since the rear support is approximately at the center of gravity of the engines, the engines as such place very little load on the surrounding structure. Where it is practicable to locate the supports for the reduction gear assembly approximately in the same vertical plane as the center of gravity of the reduction gear and propeller assembly, the same situation would arise with respect to loading due to the weight or acceleration of the reduction gear and propeller assembly. In this case, the interconnecting assembly could be still further lightened. However, as a matter of practical installation in some aircraft, it is not feasible structurally to move the reduction gear supports forward so as to achieve this end.

Therefore, it may be said that the major loading of the interconnecting assembly of Figures 1 and 2 is due to the overhung weight of the propeller and reduction gear ahead of the forward supports. The arrangement according to the invention makes it possible to resist these stresses with a particularly simple and light-weight structure and one which is particularly suited to the needs of the aircraft designer in providing for installation of the power plant. It may be noted also that the three-point suspension of the entire power plant prevents the transmission of stresses to the power plant as a result of deflections of the aircraft structure.

The torque loading due to the power transmitted through the shafts 22 is taken by the shaft housings 26. The shafts 22 both turn in the same direction, so that the torque is taken by torsional shear in each housing and differential bending of the two housings.

Loads due to horizontal acceleration of the power plant are taken by the shaft housings 26. These also take some of the vertical shear loads due to the vertical accelerations.

In order to align the entire power plant properly and provide for tolerance in manufacture, provision is made for adjusting the effective length of the struts 37. The preferred arrangement for this purpose is illustrated in Figures 6 to 8. The strut 37, which is of tubular construction for lightness, has welded to the forward end thereof a fitting 71 which is cross bored as indicated at 72 for the pin 38 by which it is coupled to the clevis fitting 39 on the reduction gear case. As preferably constructed this fitting 39 comprises a shank 73 extending through openings 74 in the rear wall of the reduction gear casing. The forward end of the shank 73 extends through the forward face of the rear part of the casing, as indicated at 75 in Figures 1 and 2, where it is held by a nut 76, the shank 73 being generally cylindrical. The fitting 39 may be rotated to the proper angle for attachment of the strut 37.

The bolt or pin 38 has two concentric cylindrical portions 77 and 78 which fit in bores of the arms of the clevis 39 and an eccentric cylindrical portion 79 which fits in the bore 72 of the end fitting of the strut. The head 81 of the pin is splined, as shown most clearly in Figures 6 and 8, and the fitting 39 is counterbored and splined to receive the head 81 and hold it against rotation. The pin 38 is normally held in place by a nut 82. In order to adjust the effective length of the strut 37, the nut 82 is backed off slightly to permit the head to clear the splines. The pin 38 may then be turned by a suitable tool inserted in a slot 83 in the head. Since the eccentricity of the portion 72 is relatively small and the number of splines fairly large, a rather precise adjustment may be made within the desired range of movement and the adjustment cannot accidentally shift once the nut 82 is tightened.

In assembling the power plant, the power units B are set up in a fixture which correctly aligns the forward faces of the compressor inlet frame 11, and the interconnecting brackets 31 are tightened in place with the units so aligned. The rear interconnecting brackets 43 are then fixed in place. With the two power units properly aligned, the reduction A, extension shafts 22, and shaft housings 26 are assembled onto the power units, the shaft housings being bolted at each end.

With the engine horizontal and the reduction gear and power units both supported at their centers of gravity so as to eliminate deflection of the shaft housings, the struts 37 are put in place, the pin 38 being rotated to the position in which it slips freely into place. When the assembly is made thus the entire power plant is properly aligned under minimum stress conditions. It would be possible to preload the struts 37 to compensate for the extension thereof due to the overhanging weight of the propeller and reduction gear, but this refinement is unnecessary.

The principles of the invention may also be applied to great advantage in an installation of the general character of that previously described differing principally in that each power plant installation consists of a single gas turbine engine or power unit coupled to a reduction gear. An arrangement of this sort is illustrated in Figures 10 to 12.

The power plant of Figures 10 to 12 comprises a reduction gear assembly C which may be similar in character to the reduction gear A except that it is provided with only a single power input shaft. The power unit B may be identical in all respects to the power units B previously described. The power unit drives the reduction gear by means of a shaft such as that previously described mounted in the hollow strut 26. This structure also may be identical to that previously described. The units B and C are additionally coupled by struts 37 extending between pads 33' bolted to the upper quarter positions of the forward frame 11 of the power unit and fittings 39' on the reduction gear. The fittings 33' and 39' may be substantially the same as those previously described except that some variation of form is necessary because of the different angular direction of the struts 37. In the form of Figures 10 and 11, the struts 37 converge toward the power unit, and the axes of the three struts 26 and 37 preferably intersect at a point at or near the vertical plane through the rear support of the power unit at the midframe 13.

The reduction gear is supported at two points defining a transverse axis of suspension, as in the previous case. Figures 10 and 11, however, illustrate an arrangement in which the axis of support of the reduction gear is near the forward end of the reduction gear. By virtue of this arrangement, the reduction gear supports may be adjacent the center of gravity of the assembly comprising the reduction gear and the propeller (not shown) which is mounted on the propeller shaft 17'. In this case a single propeller shaft is provided. The reduction gear C comprises a forward portion 90 from which arms 91 extend laterally. A support arrangement which may be substantially identical to that previously described may be attached to each of the arms 91 to support the reduction gear on frame members 68' of the aircraft. This supporting means on each side may include a bracket 63 mounted on the reduction gear and coupled through a resilient connection to a bracket 66 on the aircraft. The power plant is additionally supported, as before, at the midframe 13 of the power unit by a support which provides for longitudinal expansion of the compressor and prevents transmission of longitudinal stresses to the engine as a result of deformation of the structure of the aircraft. The power unit may be supported from a plate 52' in the aircraft by hanger arrangements coupled preferably to the two upper or the two lower pads on the midframe. The power unit may, however, be supported by means of the two pads on one side or by a single pad.

The details of the engine support are not material to the principles of the invention, but, for purposes of illustration, I have shown brackets 92 fixed to the two upper pads 42 and a bracket 93 fixed to the plate 52'. A link or yoke 94 formed with clevis ends is articulated to these brackets by bolts 95 and 96. The support 93 preferably includes rubber bushings in the manner previously described.

As in the form previously described, the struts 37 are pivotally mounted at both ends so that they carry only tension or compression stresses. Since the point of support of the reduction gear is moved forward, the tension or compression stress on the struts 37 due to the overhanging mass of the reduction gear and propeller is reduced. Since the supports 92 are approximately at the center of gravity of the power unit, there will be no substantial load on the interconnecting structure due to acceleration of the aircraft and this structure will need only to be of sufficient strength and rigidity to maintain proper alignment of the power unit and reduction gear and transmit the torque reaction of the engine.

Since the principle of the form of the invention shown in Figures 10 to 12 is the same as that of the form of Figures 1 and 2 and structural details may follow in general those shown in Figures 1 to 3 and 6 to 8, inclusive, it is believed that no further explanation of Figures 10 to 12 is required.

It may be noted that the provision of four pads on each forward frame 11 and midframe 13 makes it possible to use identical power units for the single engine installation and for the right-hand and left-hand engines of the dual installation.

Since there is nothing in the way of providing air inlet ducting to each power unit other than the struts 26 and 37 the provision of adequate arrangement for air supply to the engines is greatly facilitated by comparison with arrangements involving a complicated truss type interconnecting structure between the engine and reduction gear.

It will be understood that the orientation of the assemblies may be varied, as by inclining, rotating, or inverting them; references to directions or orientation in the claims are for clarity of expression and are not to be construed as limiting the meaning of the claims to a particular orientation of the engine with respect to an absolute vertical or horizontal direction, or the direction of movement of a vehicle embodying the invention.

The description herein of the preferred embodiments of the invention, in order to illustrate the principles thereof, is not to be considered as limiting the scope of the invention. Many modifications may be made by the exercise of skill in the art within the principles of the invention.

I claim:

1. A power plant installation, comprising, in combination, a load device, means on the load device defining a transverse axis of support therefor, a prime mover disposed rearwardly of the load device comprising an engine, a power transmission shaft coupling the engine to the load device, a strut extending from the engine to the load device along the axis of the engine, the strut being a tubular member encasing the power transmission shaft and fixed rigidly to the engine and load device, and means providing a support for the power plant adjacent the center of gravity of the engine, the last-named support providing freedom of movement for longitudinal expansion of the prime mover.

2. A power plant installation, comprising, in combination, a load device, a prime mover disposed rearwardly of the load device comprising an engine, a power transmission shaft coupling the engine to the load device, a first strut extending from the engine to the load device along the axis of the engine, the first strut being a tubular member encasing the power transmission shaft and fixed rigidly to the engine and load device, and second strut means extending from the load device to the forward end of the prime mover consisting of two struts spaced horizontally from each other and spaced vertically from the axis of the engine, the plane containing the axes of the two struts of the second strut means intersecting the axis of the engine.

3. A power plant installation, comprising, in combination, two engines disposed side by side with their axes substantially parallel, means coupling the engines together structurally, a reduction gear assembly forward of the engines and coupled to both engines by power transmission means, four struts extending between the reduction gear assembly and the engines, two to each engine, the struts comprising two pairs of struts with one pair disposed above the other pair and with the axes of all the said struts intersecting a common line transverse of the engines, first external supporting means for the power plant at the reduction gear defining an axis of support at the reduction gear, and a second external supporting means coupled to the engines to hold the power plant against rotation about the said axis of support; the struts of one pair being fixed rigidly to the engines and reduction gear, and the struts of the other pair being pivotally connected to the engines and reduction gear.

4. A power plant installation, comprising, in combination, two gas turbine engines disposed side by side with their axes substantially parallel, bracket means rigidly coupling the forward ends of the engine together, link means coupling the engines together aft of the bracket means, the link means being constructed to maintain the alignment of the engines while admitting of relative longitudinal expansion, a reduction gear assembly forward of the engines, a power shaft extending from each engine to the reduction gear, a hollow strut rigidly coupling each engine to the reduction gear assembly, each strut containing a said power shaft, two substantially fixed supports for the power plant located at spaced points on the reduction gear assembly, and a third support for the power plant coupled to the link means.

5. A power plant installation, comprising, in combination, two gas turbine engines disposed side by side with their axes substantially parallel, bracket means rigidly coupling the forward ends of the engines together, link means coupling the engines together aft of the bracket means, the link means being constructed to maintain the alignment of the engines while admitting of relative longitudinal expansion, a reduction gear assembly forward of the engines, a power shaft extending from each engine to the reduction gear, a hollow strut structurally coupling each engine to the reduction gear assembly, each strut containing a said power shaft, a tie rod structurally coupling each engine to the reduction gear, the tie rods being coupled to the forward ends of the engines, the tie rods being spaced vertically from the struts, the plane containing the axes of the struts intersecting the plane containing the axes of the tie rods in the vicinity of the centers of gravity of the engines, two substantially fixed supports for the power plant located at spaced points on the reduction gear assembly in the vicinity of the points of attachment of the tie rods thereto, and a third support for the power plan coupled to the link means, the third support locating the link means with provision for movement thereof axially of the engines.

6. A power plant installation, comprising, in combination, two gas turbine engines disposed side by side with their axes substantially parallel, bracket means rigidly coupling the forward ends of the engines together, link means coupling the engines together aft of the bracket means, the link means being constructed to maintain the alignment of the engines while admitting of relative longitudinal expansion, a reduction gear assembly forward of the engines, a power shaft extending from each engine to the reduction gear, a hollow strut rigidly coupling each engine to the reduction gear assembly, each strut containing a said power shaft, a tie rod structurally coupling each engine to the reduction gear, the tie rods being coupled to the forward ends of the engines, the tie rods being spaced vertically from the struts, the plane containing the axes of the struts intersecting the plane containing the axes of the tie rods in the vicinity of the centers of gravity of the engines, two substantially fixed supports for the power plant located at spaced points on the reduction gear assembly, and at hird support for the power plant coupled to the link means, the third support locating the link means with provision for movement thereof axially of the engines.

7. An aircraft power plant installation, comprising, in combination, two gas turbine engines disposed side by side with their axes substantially parallel, bracket means rigidly coupling the forward ends of the engines together, link means coupling the engines together aft of the bracket means, the link means being constructed to maintain the alignment of the engines while admitting of relative longitudinal expansion, a reduction gear assembly forward of the engines, a power shaft extending from each engine to the reduction gear, a hollow strut rigidly coupling each engine to the reduction gear assembly, each strut containing a said power shaft, and a tie rod structurally coupling each engine to the reduction gear, the tie rods being coupled to the forward ends of the engines, the tie rods being spaced vertically from the struts, the plane containing the axes of the tie rods converging toward the plane containing the axes of the struts in the direction of the engines, and the tie rods diverging from each other in the direction from the reduction gear to the engines.

8. A power plant installation comprising, in combination, two gas turbine engines disposed in parallel side-by-side arrangement, each engine comprising a compressor, a combustion section, and a turbine, the combustion section and turbine being supported in cantilever fashion from the compressor, means yoking the compressors together, a reduction gear disposed forwardly of the engines, an engine shaft coupling each engine to the reduction gear for power transmission, a hollow columnar member fixed to the forward end of each compressor and to the rear of the reduction gear and housing a said engine shaft, and a strut extending from each compressor to the rearward portion of the reduction gear, the struts being spaced vertically from the columnar members, the plane containing the axes of the columnar members and the plane containing the axes of the struts passing near the centers of gravity of the engines.

9. A power plant installation comprising, in combination, two gas turbine engines disposed in parallel side-by-side arrangement, each engine comprising a compressor, a combustion section, and a turbine, the combustion section and turbine being supported in cantilever fashion from the compressor, means yoking the compressors together, a reduction gear disposed forwardly of the engines, an engine shaft coupling each engine to the reduction gear for power transmission, a hollow columnar member fixed to the forward end of each compressor and to the rear of the reduction gear and housing a said engine shaft, a strut extending from each compressor to the rearward portion of the reduction gear, the struts being spaced vertically from the columnar members, the plane containing the axes of the columnar members and the plane containing the axes of the struts passing near the centers of gravity of the engines; two spaced substantially fixed supports for the power plant on the reduction gear, and a third support for the power plant coupled to the compressor yoking means, the third support being adapted to locate the axis of the power plant and to allow longitudinal expansion of the compressors.

10. A power plant installation comprising, in combination, two gas turbine engines disposed in parallel side-by-side arrangement, each engine comprising, from front to rear, an axial-flow compressor, a combustion section, and a turbine, the combustion section and turbine being supported in cantilever fashion from the compressor, the center of gravity of each engine being adjacent the rearward end of the compressor, means rigidly yoking the forward ends of the compressors together, means yoking the rearward ends of the compressors together with freedom for relative expansion longitudinally of the engines, a reduction gear disposed forwardly of the engines, an engine shaft coupling each engine to the reduction gear for power transmission, a hollow columnar member fixed to the forward end of each compressor and to the rear of the reduction gear and housing a said engine shaft, a strut extending from the forward end of each compressor to the rearward portion of the reduction gear, the struts being spaced vertically from the columnar members, the plane containing the axes of the columnar members and the plane containing the axes of the struts intersecting near the rearward ends of the compressors; two spaced substantially fixed supports for the power plant on the reduction gear, and a third support for the power plant coupled to the yoking means at the rearward ends of the compressors, the third support being adapted to locate the axis of the power plant and to allow longitudinal expansion of the compressors.

11. An aircraft propulsion installation, comprising, in combination, a reduction gear adapted to mount a propeller on the forward end thereof, a gas turbine engine disposed rearwardly of the reduction gear, a power transmission shaft coupling the engine to the reduction gear, and a structural coupling between the engine and reduction gear consisting of three struts in triangular array coupled to the forward end of the engine, the axes of the struts converging toward the engine, one of the struts being a tubular member encasing the power transmission shaft and fixed rigidly to the engine and reduction gear.

12. An aircraft propulsion installation, comprising, in combination, a reduction gear adapted to mount a propeller on the forward end thereof, a gas turbine engine disposed rearwardly of the reduction gear, a power transmission shaft coupling the engine to the reduction gear, and a structural coupling between the engine and reduction gear comprising three struts in triangular array coupled to the forward end of the engine, the axes of the struts converging toward the engine and passing adjacent the center of gravity of the engine; one of the struts being a tubular member encasing the power transmission shaft and fixed rigidly to the engine and reduction gear.

13. An aircraft propulsion installation, comprising, in combination, a reduction gear adapted to mount a propeller on the forward end thereof, means on the reduction gear defining a transverse axis of support therefor, a gas turbine engine disposed rearwardly of the reduction gear, a power transmission shaft coupling the engine to the reduction gear, a structural coupling between the engine and reduction gear comprising three struts in triangular array coupled to the forward end of the engine, the axes of the struts converging toward the engine and passing adjacent a point within the engine, and means providing a support for the propulsion installation adjacent the said point; one of the struts being rigidly fixed to the engine and reduction gear, and the other struts being pivotally connected to the engine and reduction gear.

14. A power plant installation, comprising, in combination, a load device, means on the load device defining a transverse axis of support therefor, a prime mover disposed rearwardly of the load device comprising a plurality of engines, a power transmission shaft coupling each engine to the load device, a strut extending from each engine to the load device along the axis of the engine, the strut being a tubular member encasing the power transmission shaft and fixed rigidly to the engine and load device, and means providing a support for the power plant adjacent the position longitudinally of the prime mover of the center of gravity of each engine, the last-named support providing freedom of movement for longitudinal expansion of the prime mover.

15. A power plant installation comprising, in combination, a load device, a prime mover disposed rearwardly of the load device comprising a plurality of engines, a power transmission shaft coupling each engine to the load device, a first strut extending from each engine to the load device along the axis of the engine, the first strut being a tubular member encasing the power transmission shaft and fixed rigidly to the engine and load device, and second strut means extending from the load device to the forward end of the prime mover consisting of two struts spaced horizontally from each other and spaced vertically from the axes of the engines, the plane containing the axes of the two struts of the second strut means intersecting the axis of each engine.

16. A power plant installation comprising, in combination, a power transmission device, means on the power transmission device defining a transverse axis of support therefor, a prime mover disposed rearwardly of the power transmission device comprising a gas turbine engine, a power transmission shaft coupling the engine to the power transmission device, a first strut extending from the engine to the power transmission device along the axis of the engine, the first strut being a tubular member encasing the power transmission shaft and fixed rigidly to the engine and power transmission device, second strut means extending from the power transmission device to the forward end of the prime mover consisting of two struts spaced horizontally from each other and spaced vertically from the axis of the engine, the plane containing the axes of the two struts of the second strut means intersecting the axis of the engine adjacent the center of gravity of the engine, and means providing a support for the power plant adjacent the center of gravity of the engine, the last-named support providing freedom of movement for longitudinal expansion of the prime mover.

17. A power plant installation comprising, in combination, a power transmission device, means on the power transmission device defining a transverse axis of support therefor, a prime mover disposed rearwardly of the power transmission device comprising a plurality of gas turbine engines, a power transmission shaft coupling each engine to the power transmission device, a first strut extending from each engine to the power transmission device along the axis of the engine, the first strut being a tubular member encasing the power transmission shaft and fixed rigidly to the engine and power transmission device, second strut means extending from the power transmission device to the forward end of the prime mover consisting of two struts spaced horizontally from each other and spaced vertically from the axes of the engines, the plane containing the axes of the two struts of the second strut means intersecting the axis of each engine adjacent the center of gravity of the engine, and means providing a support for the power plant adjacent the center of gravity of the engines, the last-named support providing freedom of movement for longitudinal expansion of the prime mover.

18. A power installation comprising, in combination, a power transmission device, means defining a transverse axis of support for the power transmission device, a gas turbine power plant disposed rearwardly of the power transmission device and coupled thereto for power transmission, the power plant comprising a gas turbine engine, a first strut extending from the engine to the power transmission device along the axis of the engine, second strut means extending from the power transmission device to the forward end of the power plant consisting of two struts spaced horizontally from each other and spaced vertically from the axis of the engine, the plane containing the axes of the two struts of the second strut means intersecting the axis of the engine, and means providing a support for the propulsion installation adjacent the said intersection.

19. A power installation comprising, in combination, a power transmission device, means defining a transverse axis of support for the power transmission device, a power plant disposed rearwardly of the power transmission device and coupled thereto for power transmission, the power plant comprising a plurality of engines, a first strut extending from each engine to the power transmission device along the axis of the engine, second strut means extending from the power transmission device to the forward end of the power plant consisting of two struts spaced horizontally from each other and spaced vertically from the axis of each engine, the plane containing the axes of the two struts of the second strut means intersecting the axis of each engine, and means providing a support for the propulsion installation adjacent the said intersections.

20. A power installation comprising, in combination, a power transmission device, means defining a transverse axis of support for the power transmission device, a gas turbine power plant disposed rearwardly of the power transmission device and coupled thereto for power transmission, the power plant comprising a gas turbine engine, a first strut extending from the engine to the power transmission device along the axis of the engine, the first strut being a tubular member fixed to the engine and power transmission device and encasing a power transmission shaft therebetween, second strut means extending from the power transmission device to the forward end of the power plant consisting of two struts spaced horizontally from each other and spaced vertically from the axis of the engine, the plane containing the axes of the two struts of the second strut means intersecting the axis of the engine, and means providing a support for the propulsion installation adjacent the said intersection.

21. A power installation comprising, in combination, a power transmission device, means defining a transverse axis of support for the power transmission device, a gas turbine power plant disposed rearwardly of the power transmission device and coupled thereto for power transmission, the power plant comprising a plurality of gas turbine engines, a first strut extending from each engine to the power transmission device along the axis of the engine, the first strut being a tubular member fixed to the engine and power transmission device and encasing a power transmission shaft therebetween, second strut means extending from the power transmission device to the forward end of the power plant consisting of two struts spaced horizontally from each other and spaced vertically from the axis of each engine, the plane containing the axes of the two struts of the second strut means intersecting the axis of each engine, and means providing a support for the propulsion installation adjacent the said intersections.

22. A power installation comprising, in combination, a power transmission device, means defining a transverse axis of support for the power transmission device, a power plant disposed rearwardly of the power transmission device and coupled thereto for power transmission, the power plant comprising a gas turbine engine, a first strut extending from the engine to the power transmission device along the axis of the engine, second strut means extending from the power transmission device to the forward end of the power plant consisting of two struts spaced horizontally from each other and spaced vertically from the axis of the engine, the plane containing the axes of the two struts of the second strut means intersecting the axis of the engine adjacent the center of gravity of the engine, and means providing a support for the propulsion installation adjacent the center of gravity of the power plant.

23. A power installation comprising, in combination, a power transmission device, means defining a transverse axis of support for the power transmission device, a power plant disposed rearwardly of the power transmission device and coupled thereto for power transmission, the power plant comprising a plurality of gas turbine engines, a first strut extending from each engine to the power transmission device along the axis of the engine, second strut means extending from the power transmission device to the forward end of the power plant consisting of two struts spaced horizontally from each other and spaced vertically from the axis of each engine, the plane containing the axes of the two struts of the second strut means intersecting the axis of each engine adjacent the center of gravity of the engine, and means providing a support for the propulsion installation adjacent the center of gravity of the power plant.

24. An aircraft propulsion installation comprising, in combination, a reduction gear adapted to mount a propeller on the forward end thereof, means defining a transverse axis of support for the reduction gear, a power plant disposed rearwardly of the reduction gear and coupled thereto for power transmission, the power plant comprising a gas turbine engine, a first strut extending from the engine to the reduction gear along the axis of the engine, second strut means extending from the reduction gear to the forward end of the power plant consisting of two struts spaced horizontally from each other and spaced vertically from the axis of the engine, the plane containing the axes of the two struts of the second strut means intersecting the axis of the engine adjacent the center of gravity of the engine, and means providing a support for the propulsion installation adjacent the said intersection.

25. An aircraft propulsion installation comprising, in combination, a reduction gear adapted to mount a propeller on the forward end thereof, means defining a transverse axis of support for the reduction gear, a power plant disposed rearwardly of the reduction gear and coupled thereto for power transmission, the power plant comprising a plurality of gas turbine engines, a first strut extending from each engine to the reduction gear along the axis of the engine, second strut means extending from the reduction gear to the forward end of the power plant consisting of two struts spaced horizontally from each other and spaced vertically from the axis of each engine, the plane containing the axes of the two struts of the second strut means intersecting the axis of each engine adjacent the center of gravity of the engine, and means providing a support for the propulsion installation adjacent the said intersection.

26. A power plant installation comprising, in combination, a power transmission device, means on the power transmission device defining a transverse axis of support therefor, a gas turbine engine disposed rearwardly of the power transmission device, a power transmission shaft coupling the engine to the power transmission device, a structural coupling between the engine and power transmission device comprising three struts in triangular array coupled to the forward end of the engine, the axes of the struts converging toward the engine and passing adjacent a point within the engine, and means providing a support for the power plant adjacent the said point.

27. A power plant installation comprising, in combination, a power transmission device, means on the power transmission device defining a transverse axis of support therefor, a gas turbine engine disposed rearwardly of the power transmission device, a power transmission shaft coupling the engine to the power transmission device, a structural coupling between the engine and power transmission device comprising three struts in triangular array coupled to the forward end of the engine, the axes of the struts converging toward the engine and passing adjacent a point within the engine, and means providing a support for the power plant adjacent the said point; one of the struts being a tubular member encasing the power transmission shaft and fixed rigidly to the engine and reduction gear.

References Cited in the file of this patent

UNITED STATES PATENTS

| | | |
|---|---|---|
| 945,391 | Hodgkinson | Jan. 4, 1910 |
| 1,887,862 | Simmen | Nov. 15, 1932 |
| 2,481,547 | Walker et al. | Sept. 13, 1949 |
| 2,539,960 | Marchant et al. | Jan. 30, 1951 |

FOREIGN PATENTS

| | | |
|---|---|---|
| 891,571 | France | Dec. 11, 1943 |
| 523,020 | Great Britain | July 3, 1940 |